United States Patent
Qiu et al.

(10) Patent No.: US 11,640,059 B2
(45) Date of Patent: May 2, 2023

(54) HEAD-MOUNTED DISPLAY OPTICAL MODULE

(71) Applicant: SeeYA Optronics Co., Ltd., Shanghai (CN)

(72) Inventors: Sunjie Qiu, Shanghai (CN); Lei Niu, Shanghai (CN)

(73) Assignee: SeeYA Optronics Co., Ltd., Shanghai (CN)

( * ) Notice: Subject to any disclaimer, the term of this patent is extended or adjusted under 35 U.S.C. 154(b) by 330 days.

(21) Appl. No.: 17/004,380

(22) Filed: Aug. 27, 2020

(65) Prior Publication Data

US 2021/0199968 A1    Jul. 1, 2021

(30) Foreign Application Priority Data

Dec. 25, 2019   (CN) .......................... 201911359455.1

(51) Int. Cl.
*G02B 27/01* (2006.01)
*G02B 5/10* (2006.01)
*G02B 1/14* (2015.01)

(52) U.S. Cl.
CPC ........... *G02B 27/0172* (2013.01); *G02B 1/14* (2015.01); *G02B 5/10* (2013.01)

(58) Field of Classification Search
CPC ........ G02B 1/14; G02B 5/10; G02B 27/0172; G02B 27/017; G02B 27/01
USPC .......................................................... 359/13
See application file for complete search history.

(56) References Cited

U.S. PATENT DOCUMENTS

| | | | |
|---|---|---|---|
| 2016/0274695 A1* | 9/2016 | Ando | G02B 1/113 |
| 2016/0377970 A1 | 12/2016 | Norton et al. | |
| 2017/0008022 A1* | 1/2017 | deVos | C08K 3/36 |
| 2017/0199442 A1* | 7/2017 | Kim | G02B 26/0875 |
| 2017/0276944 A1* | 9/2017 | Kim | G02B 26/007 |
| 2017/0293147 A1* | 10/2017 | Tremblay | G02B 5/189 |
| 2018/0120564 A1* | 5/2018 | Li | G02B 5/3083 |
| 2019/0004330 A1* | 1/2019 | Dobschal | G02B 27/4211 |
| 2019/0061525 A1* | 2/2019 | Ji | B60W 50/14 |

FOREIGN PATENT DOCUMENTS

| | | |
|---|---|---|
| CN | 101107545 A | 1/2008 |
| CN | 106257322 A | 12/2016 |
| CN | 109491092 A | 3/2019 |
| CN | 109493746 A | 3/2019 |
| CN | 109920936 A | 6/2019 |
| CN | 110473984 A | 11/2019 |
| CN | 110579880 A | 12/2019 |

OTHER PUBLICATIONS

Office Action for CN Application No. 20191135944.5 dated Jun. 17, 2021.

* cited by examiner

*Primary Examiner* — William R Alexander
(74) *Attorney, Agent, or Firm* — W&G Law Group

(57) ABSTRACT

A head-mounted display optical module includes an optical lens group located at a light-emitting display side of the display panel and a protective layer located on an optical path between the display panel and the optical lens group. The protective layer includes at least one first protective layer. A refractive index of the first protective layer continuously changes therein at least along a radial direction that is located in a plane of the first protective layer and points from a center of the first protective layer to an edge of the first protective layer.

9 Claims, 6 Drawing Sheets

HEAD-MOUNTED DISPLAY OPTICAL MODULE

CROSS-REFERENCE TO RELATED APPLICATIONS

The present application claims the benefit of priority to Chinese Patent Application No. 201911359455.1, filed on Dec. 25, 2019, which is incorporated herein by reference in its entirety.

TECHNICAL FIELD

The present disclosure relates to the field of head-mounted displays, and in particular, to a head-mounted display optical module.

BACKGROUND

Both virtual reality technology and augmented reality technology are computer simulation systems that can create and experience virtual worlds and have been widely used in various fields such as games, entertainment, education, medical treatment, and military simulation.

In related designs, light emitted by a display panel utilizing the virtual reality technology and the augmented reality technology at a large exit angle has a problem of color shift, that is, large viewing angle color shift, which will affect an image quality observed by a user. In addition, the light emitted by the display panel at the large exit angle has low energy and a low optical efficiency.

SUMMARY

An embodiment of the present disclosure provides a head-mounted display optical module for imaging a display image of a display panel at a user viewing side. The head-mounted display optical module includes an optical lens group located at a light-emitting display side of the display panel, and at least one protective layer located on an optical path between the display panel and the optical lens group. The at least one protective layer includes at least one first protective layer that has a refractive index continuously changing therein at least along a radial direction that is located in a plane of the first protective layer and points from a center of the first protective layer to an edge of the first protective layer.

In an embodiment, the refractive index of the first protective layer satisfies: $n = m_0 + m_2 \cdot r^2 + m_4 \cdot r^4 + j \cdot z_1$, where n denotes the refractive index of the first protective layer, r denotes a radial distance from the center of the first protective layer, $z_1$ denotes an axial distance from the center of the first protective layer, the axial direction is perpendicular to a plane of the first protective layer, and $m_0$, $m_2$, $m_4$, and j are real numbers.

In the head-mounted display optical module provided by the embodiment of the present disclosure, an image displayed on the display panel is emitted to an outside of the display panel in a form of light of various angles. Since in the embodiment of the present disclosure the refractive index of an interior of the first protective layer continuously changes at least along the radial direction, when the light emitted from the display panel is projected to the first protective layer, different positions of the first protective layer have different refractive indexes, to match with the light emitted from different positions of the display panel at different angles. Due to presence of the first protective layer, the first protective layer can amplify the exit angle of the light emitted by the display panel to a relatively large level at a position where a large exit angle is required, the first protective layer can amplify the exit angle of the light emitted by the display panel to a moderate level at a position where a medium exit angle is required, and the first protective layer can amplify the exit angle of the light emitted by the display panel to a relatively small level at a position where a small exit angle is required. In short, due to the presence of the first protective layer in the protective layer, it is possible to lower design requirements for the display panel, decrease the exit angle of the light emitted by the display panel, reduce or even avoid large viewing angle color shift of the display panel, in order to enable the user to observe the image without color shift at a large field of view and also improve an optical efficiency.

DESCRIPTION OF EMBODIMENTS

The present disclosure will be further described in detail below with reference to the drawings and embodiments. It can be understood that the specific embodiments described herein are only used to explain the present disclosure, rather than to limit the present disclosure. In addition, it should be noted that, in order to facilitate description, the drawings only show parts related to the present disclosure but not all structures.

The head-mounted display optical module is configured to image and project the image displayed on the display panel at the user viewing side. The light emitted from the display panel is finally projected to the user viewing side in parallel light. Since the larger the incidence angle of the light projected to the user viewing side, the larger the field of view at which the user observes the image, the larger the size of the finally imaged image, and the better the user experience. Imaging at large field of view at which the user observes the image requires that the exit angle of the light emitted by the display panel is relatively large, but the light emitted by the display panel at a large exit angle has the problems of color shift and low optical efficiency, that is, the large viewing angle color shift, which will result in low image quality observed by the user, and also relatively low optical efficiency.

Figure 1:
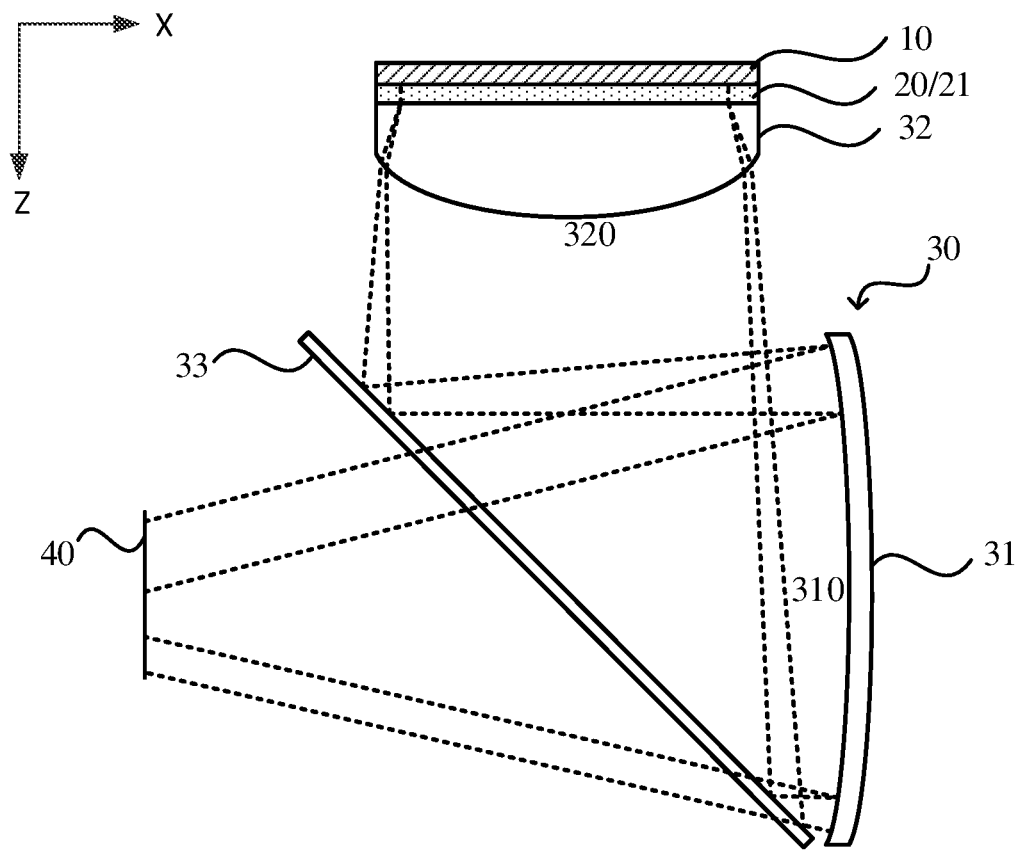
FIG. 1 is a schematic diagram of a head-mounted display optical module provided by an embodiment of the present disclosure.
Figure 2:
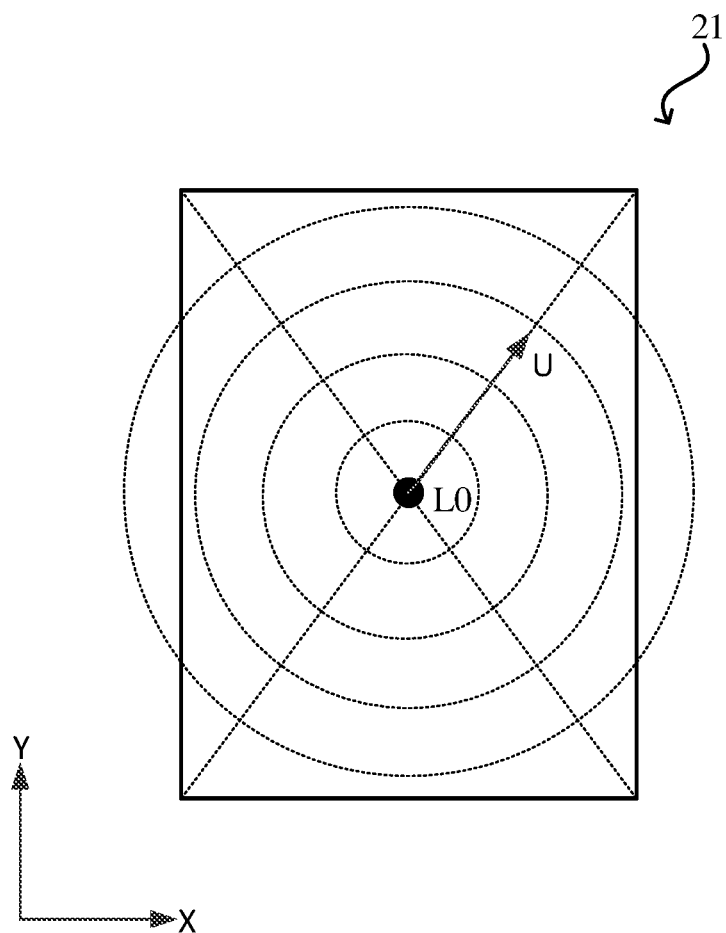
FIG. 2 is a top view of a first protective layer shown in FIG. 1.

FIG. 1 is a schematic diagram of a head-mounted display optical module provided by an embodiment of the present disclosure, and FIG. 2 is a top view of a first protective layer shown in FIG. 1. Referring to FIG. 1 and FIG. 2, the head-mounted display optical module includes at least one protective layer 20 and an optical lens group 30. The optical lens group 30 is located at a light-emitting display side of the display panel 10. The protective layer 20 is located on an optical path between the display panel 10 and the optical lens group 30. Light emitted from the display panel 10 is first projected to the protective layer 20 and then projected to a user viewing side 40 via the optical lens group 30. The at least one protective layer 20 includes at least one first protective layer 21, a refractive index of the first protective layer 21 continuously changes therein at least along a radial direction, and the radial direction U is located in a plane of the first protective layer 21 and points from a center L0 of the first protective layer 21 to an edge of the first protective layer 21. The center L0 of the first protective layer 21 can be a center of gravity of the first protective layer 21.

Exemplarily, referring to FIG. 1 and FIG. 2, the first protective layer 21 can be made of a material having a gradient refractive index. The refractive index of the first protective layer 21 can continuously change therein along the radial direction U, or the refractive index of the first protective layer 21 can continuously change therein along the radial direction U and an axial direction. The axial direction is a direction perpendicular to the plane of the first protective layer 21. In FIG. 1 and FIG. 2, the plane of the first protective layer 21 is located is a plane defined by a direction X and a direction Y, and a direction Z is the axial direction of the first protective layer 21.

In the head-mounted display optical module provided by the embodiment of the present disclosure, an image displayed on the display panel is emitted to an outside of the display panel in a form of light with various angles. Since in the embodiment of the present disclosure the refractive index of the interior of the first protective layer continuously changes at least along the radial direction, when the light emitted from the display panel is projected to the first protective layer, different positions of the first protective layer have different refractive indexes, to match with the light emitted from different positions of the display panel at different angles. Due to presence of the first protective layer, the first protective layer can amplify the exit angle of the light emitted by the display panel to a relatively large level at a position where a large exit angle is required, the first protective layer can amplify the exit angle of the light emitted by the display panel to a moderate level at a position where a medium exit angle is required, and the first protective layer can amplify the exit angle of the light emitted by the display panel to a relatively small level at a position where a small exit angle is required. In short, due to the presence of the first protective layer in the protective layer, it is possible to lower design requirements for the display panel, decrease the requirement for an exit angle of the light emitted by the display panel, reduce or even avoid large viewing angle color shift of the display panel, in order to enable the user to observe the image without color shift at a large field of view, and also improve an optical efficiency of light at a large viewing angle to improve an energy utilization rate.

It should be noted that in the embodiment of the present disclosure, the first protective layer can use a material having a gradient refractive index, and the first protective layer having the gradient refractive index is used in the field of head-mounted display (including virtual reality and augmented reality), but not in other technical fields. A role of the first protective layer having the gradient refractive index is to match the light emitted from different positions of the display panel at different angles, to refract (diffuse), to different degrees, the light emitted from the different positions at different angles. The first protective layer having the gradient refractive index is different from a gradient index lens in the optical field, and the gradient index lens in the related art often acts like a convex lens to converge light or acts as a concave lens to diverge light. The gradient index lens in the related art is a design in which there is a fixed focus, while in the present disclosure, the first protective layer is not intended to realize the function of the convex lens or the concave lens, that is, a design purpose and a principle of the first protective layer in the present disclosure are different from those of the gradient index lens presented in the related art.

Exemplarily, referring to FIG. 1 and FIG. 2, an exit angle of light emitted from a center of the display panel 10 is relatively small, and an exit angle of light emitted from an edge of the display panel 10 is relatively large. The refractive index of the first protective layer 21 can gradually increase therein along the radial direction U.

In an embodiment, referring to FIG. 1 and FIG. 2, the refractive index of the first protective layer 21 satisfies: $n=m_0+m_2 \cdot r^2+m_4 \cdot r^4+j \cdot z_1$, where n denotes the refractive index of the first protective layer, r denotes a radial distance from the center L0 of the first protective layer 21, $z_1$ denotes an axial distance from the center L0 of the first protective layer 21, the axial direction is perpendicular to the plane of the first protective layer 21, and $m_0$, $m_2$, $m_4$ and j are real numbers. It should be noted that a formula which the refractive index n of the first protective layer 21 satisfies is a formula suitable for the field of virtual reality or the field of augmented reality display. In other embodiments, the refractive index n of the first protective layer 21 can also be in other forms, and it is not limited to the form of this formula.

In an embodiment, $n=1.5+0.046r^2$. In the embodiment of the present disclosure, the refractive index n of the first protective layer 21 is mainly related to $r^2$, and the refractive index n of the first protective layer 21 conforms to a parabolic form. In the embodiment of the present disclosure, the formula $n=1.5+0.046r^2$ can be obtained by the formula $n=m_0+m_2 \cdot r^2+m_4 \cdot r^4+j \cdot z_1$ in a case where $m_0=1.5$, $m_2=0.046$, $m_4=0$, and $j=0$.

In an embodiment, $n=1.5+0.01r^2+0.004r^4$. In the embodiment of the present disclosure, the refractive index n of the first protective layer 21 is related to $r^4$ in addition to being related to $r^2$. In the embodiment of the present disclosure, the formula $n=1.5+0.01r^2+0.004r^4$ can be obtained by the formula $n=m_0+m_2 \cdot r^2+m_4 \cdot r^4+j \cdot z_1$ in a case where $m_0=1.5$, $m_2=0.01$, $m_4=0.0004$, and $j=0$.

In an embodiment, the refractive index of the first protective layer 21 further continuously changes therein along the axial direction. The refractive index n of the first protective layer 21 satisfies: $n=1.5+0.005r^2+0.0001r^4+0.003z_1$ in the embodiment of the present disclosure, the refractive index n of the first protective layer 21 is related to the axial direction in addition to being related to $r^2$ and $r^4$. In the embodiment of the present disclosure, the formula $n=1.5+0.005r^2+0.0001r^4+0.003z_1$ can be obtained by the formula $n=m_0+m_2 \cdot r^2+m_4 \cdot r^4+j \cdot z_1$ in a case where $m_0=1.5$, $m_2=0.005$, $m_4=0.0001$, and $j=0.003$.

Figure 3:
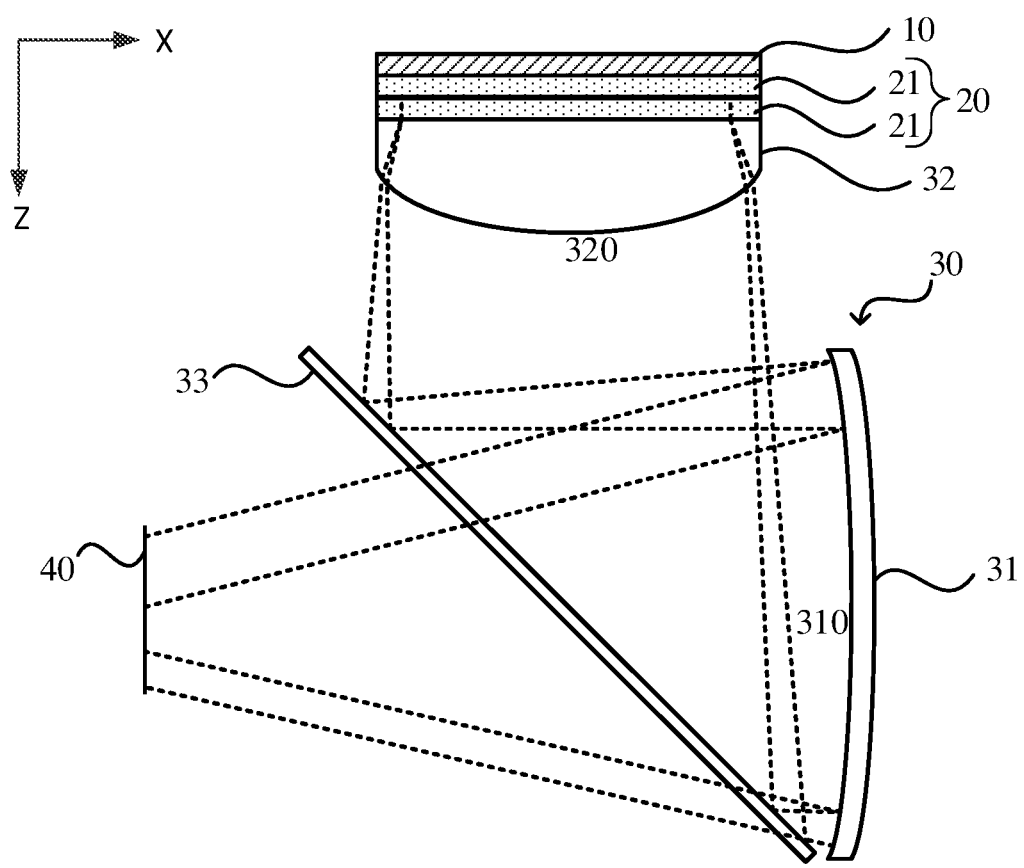
FIG. 3 is a schematic diagram of a head-mounted display optical module provided by another embodiment of the present disclosure.

FIG. 3 is a schematic diagram of a head-mounted display optical module provided by another embodiment of the present disclosure. Referring to FIG. 3, the protective layer 20 includes at least two first protective layers 21. Compared with only one first protective layer 21, the at least two first protective layers 21 can further reduce requirement of the exit angle of the light emitted by the display panel 10, to further reduce the large viewing angle color shift of the display panel 10. In another aspect, in the case where the exit angle of the light emitted by the display panel 10 is fixed, with respect to the case of providing one first protective layer 21, providing at least two first protective layers 21 can reduce a requirement for a change of the refractive index of the first protective layer 21, expand a range of materials that can be selected for the first protective layer 21 and reduce design difficulty of the first protective layer 21.

Figure 4:
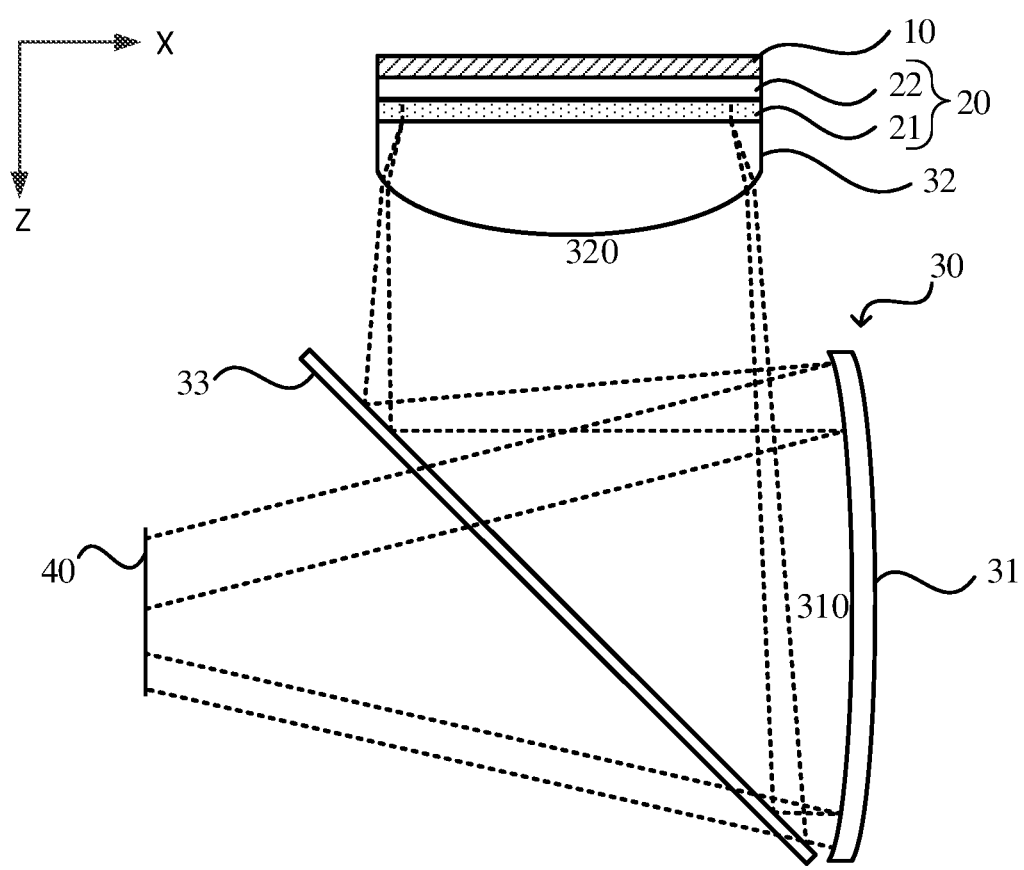
FIG. 4 is a schematic diagram of a head-mounted display optical module provided by another embodiment of the present disclosure.

FIG. 4 is a schematic diagram of a head-mounted display optical module provided by another embodiment of the present disclosure. Referring to FIG. 4, the protective layer 20 further includes at least one second protective layer 22, and any two positions inside of the second protective layer 22 have a same refractive index. In other words, the refractive indexes of the second protective layer 22 are the same at all positions thereof, and does not change gradually. The at least one second protective layer 22 is located between the display panel 10 and the at least one first protective layer 21. That is, the second protective layer 22 is located between the display panel 10 and the first protective layer 21.

Exemplarily, referring to FIG. 4, the second protective layer 22 can be a parallel glass plate, and the second protective layer 22 can be, for example, a protective cover attached to the light emitting side of the display panel 10.

In an embodiment, referring to FIG. 1, the optical lens group 30 includes a first convex lens 32, a curved mirror 31, and a transflective component 33. The curved mirror 31 is located at a side of the transflective component 33 facing away from the user viewing side 40, and the transflective component 33 is located on an optical path between the first convex lens 32 and the curved mirror 31. The first convex lens 32 is located between the protective layer 20 and the transflective component 33.

Exemplarily, referring to FIG. 1, after passing through the protective layer 20, the light emitted from the display panel passes through the first convex lens 32 and is projected to the transflective component 33, reflected by the transflective component 33 to the curved mirror 31 and projected to the transflective component 33 again after being reflected by the curved mirror 31, and then passes through the transflective component 33 and is projected to the user viewing side 40.

Exemplarily, referring to FIG. 1, in a feasible embodiment, the curved mirror 31 can be a reflective mirror, and the head-mounted display optical module is a virtual reality module. In another feasible embodiment, the curved mirror 31 can be a transflective lens, and the transflective lens can also transmit ambient light to the user viewing side, and the head-mounted display optical module is an augmented reality module.

In an embodiment, referring to FIG. 1, the curved mirror 31 includes a first aspherical surface 310, and the first aspheric surface 310 can be a surface of the curved mirror 31 facing towards the transflective component 33. The first convex lens 32 includes a second aspherical surface 320, and the second aspheric surface 320 can be, for example, a surface of the first convex lens 32 facing towards the transflective component 33. The first aspheric surface 310 and the second aspheric surface 320 satisfy an even-order aspheric surface formula:

$$z_2 = \frac{cy^2}{1+\sqrt{1-(1+k)c^2y^2}} + Ay^4 + By^6 + Cy^8 + Dy^{10} + Ey^{12} + Fy^{14},$$

where $z_2$ denotes an axial sagittal height of an aspheric surface, y denotes a radial distance of the aspheric surface, k denotes a conic coefficient, c denotes a curvature, and A, B, C, D, E, F are aspheric coefficients.

And the first aspheric surface 310 and the second aspheric surface 320 can satisfy:

| | A | B | C | D | E | F |
|---|---|---|---|---|---|---|
| first aspheric surface | 2.62e−6 | 3.96e−8 | −1.97e−11 | 1.23e−12 | 0 | 0 |
| second aspheric surface | −9.33e−5 | −3.12e−7 | 4.13e−8 | 7.60e−10 | 0 | 0, | where "e" in each numerical value such as 2.62e-6 represents the power of 10, and for example, 2.62e-6 is equivalent to $2.62*10^{-6}$.

Exemplarily, referring to FIG. 1, for the first aspherical surface 310, a direction X is an axial direction of the first aspherical surface 310, and a direction Z is a radial direction of the first aspherical surface 310. For the second aspheric surface 320, the direction X is a radial direction of the second aspheric surface 320, and the direction Z is an axial direction of the second aspheric surface 320.

TABLE 1

Table of design parameters of various optical surfaces of a first type

| Surface Number | Surface Shape | Radius of Curvature | Thickness | Material | Machinery Diameter | Conic Coefficient | X tilt | Y eccentricity |
|---|---|---|---|---|---|---|---|---|
| OBJ | Spherical Surface | Infinity | Infinity | | Infinity | 0 | | |
| STO | Spherical Surface | Infinity | 16 | | 6 | 0 | | |
| 2 | Coordinate Breakpoint | | 0 | | | | −45 | |
| 3 | Spherical Surface | Infinity | 0.5 | PMMA | 28 | 0 | | |
| 4 | Spherical Surface | Infinity | 0 | | | 0 | | |
| 5 | Coordinate Breakpoint | | 11 | | | | 45 | |
| 6 | Coordinate Breakpoint | | 0 | | | | | −0.19 |

TABLE 1-continued

Table of design parameters of various optical surfaces of a first type

| Surface Number | Surface Shape | Radius of Curvature | Thickness | Material | Machinery Diameter | Conic Coefficient | X tilt | Y eccentricity |
|---|---|---|---|---|---|---|---|---|
| 7 | Even-Order Aspheric Surface | −58.31 | −11 | MIRROR | 20 | 7.85 | | |
| 8 | Coordinate Breakpoint | | 0.13 | | | | −45 | 0.13 |
| 9 | Spherical Surface | Infinity | 0 | MIRROR | 28 | 0 | | |
| 10 | Coordinate Breakpoint | | 14.07 | | | | −45 | |
| 11 | Coordinate Breakpoint | | 0 | | | | | −0.19 |
| 12 | Even-Order Aspheric Surface | 10.95 | 4.59 | H-K9L | 15 | 0.57 | | |
| 13 | Gradient Refractive Index Surface | Infinity | 0.7 | | 15 | 0 | | |
| IMA | Spherical Surface | Infinity | | | 15 | 0 | | |

The design parameters of the corresponding optical surfaces in Table 1 correspond to the head-mounted display optical module shown in FIG. 1, and the first aspherical surface 310 and the second aspherical surface 320 satisfy:

| | A | B | C | D | E | F |
|---|---|---|---|---|---|---|
| first aspheric surface | 2.62e−6 | 3.96e−8 | −1.97e−11 | 1.23e−12 | 0 | 0 |
| second aspheric surface | −9.33e−5 | −3.12e−7 | 4.13e−8 | 7.60e−10 | 0 | 0. |

In the column of the surface number in Table 1, "OBJ" represents an object plane, and "STO" represents the user viewing side 40. "2, 5, 6, 8, 10, 11" in the column of the surface number indicate virtual surfaces and all correspond to the "Coordinate Breakpoint" in the column of the surface type, and the "Coordinate Breakpoint" is used to rotate a coordinate system. "3, 4" in the column of the surface number represent two surfaces of the transflective component 33, "7" in the column of the surface number represents the first aspheric surface 310, "9" in the column of the surface number represents a surface of the transflective component 33 adjacent to the first aspherical surface 310 where the light reaches after being reflected by the first aspherical surface 310, "12" in the column of the surface number represents the second aspherical surface 320, "13" in the column of the surface number represents a surface of the first protective layer 21, and "IMA" in the column of the surface number represents an image plane, i.e., the light-emitting display surface of the display panel 10. "Infinity" in Table 1 represents infinity. Along a propagation direction of the light, in the column of the radius of curvature, a positive value represents that a center of curvature is at a side of a surface close to the display panel 10, and a negative value represents that the center of curvature is at a side of the surface close to the user viewing side 40. In the column of the material, "PMMA" represents a polymethyl methacrylate, "MIRROR" represents a reflective material, and a space in the column of the material represents air. The value in the column of the thickness is a distance between a current surface and a previous surface. The two columns of the X tilt and the Y eccentricity are parameter columns of the virtual surfaces. The radius of curvature, the thickness, the machinery diameter and the Y eccentricity is of unit of mm. The column of the X tilt is in a unit of degree.

In an embodiment, referring to FIG. 1, the curved mirror 31 includes a first aspherical surface 310, and the first aspheric surface 310 can be a surface of the curved mirror 31 facing towards the transflective component 33. The first convex lens 32 includes a second aspherical surface 320, and the second aspheric surface 320 can be, for example, a surface of the first convex lens 32 facing towards the transflective component 33. The first aspheric surface 310 and the second aspheric surface 320 satisfy the even-order aspheric surface formula:

$$z_2 = \frac{cy^2}{1+\sqrt{1-(1+k)c^2 y^2}} + Ay^4 + By^6 + Cy^8 + Dy^{10} + Ey^{12} + Fy^{14},$$

where $z_2$ denotes an axial sagittal height of an aspheric surface, y denotes a radial distance of the aspheric surface, k denotes a conic coefficient, c denotes a curvature, and A, B, C, D, E, F are aspheric coefficients.

And the first aspheric surface 310 and the second aspheric surface 320 can satisfy:

| | A | B | C | D | E | F |
|---|---|---|---|---|---|---|
| first aspheric surface | 2.71e−6 | 4.01e−8 | −1.86e−11 | 2.13e−12 | 0 | 0 |
| second aspheric surface | −9.42e−5 | −3.23e−7 | 4.02e−8 | 6.55e−10 | 0 | 0. |

TABLE 2

Table of design parameters of various optical surfaces of a second type

| Surface Number | Surface Shape | Radius of Curvature | Thickness | Material | Machinery Diameter | Conic Coefficient | tilt | Y eccentricity |
|---|---|---|---|---|---|---|---|---|
| OBJ | Spherical Surface | Infinity | Infinity | | Infinity | 0 | | |
| STO | Spherical Surface | Infinity | 16 | | 6 | 0 | | |
| 2 | Coordinate Breakpoint | | 0 | | | | −45 | |
| 3 | Spherical Surface | Infinity | 0.5 | PMMA | 28 | 0 | | |
| 4 | Spherical Surface | Infinity | 0 | | 28 | 0 | | |
| 5 | Coordinate Breakpoint | | 11 | | | | 45 | |
| 6 | Coordinate Breakpoint | | 0 | | | | | −0.18 |
| 7 | Even-Order Aspheric Surface | −58.28 | −11 | MIRROR | 20 | 7.85 | | |
| 8 | Coordinate Breakpoint | | 0.12 | | | | −45 | 0.12 |
| 9 | Spherical Surface | Infinity | 0 | MIRROR | 28 | 0 | | |
| 10 | Coordinate Breakpoint | | 13.49 | | | | −45 | |
| 11 | Coordinate Breakpoint | | 0 | | | | | −0.18 |
| 12 | Even-Order Aspheric Surface | 10.84 | 4.58 | H-K9L | 15 | 0.57 | | |
| 13 | Gradient Refractive Index Surface | Infinity | 0.7 | | 15 | 0 | | |
| 14 | Spherical Surface | Infinity | 0.7 | N-BK7 | 15 | | | |
| IMA | Spherical Surface | Infinity | | | 15 | 0 | | |

The design parameters of the corresponding optical surface in Table 2 correspond to the head-mounted display optical module shown in FIG. 4, and the first aspheric surface 310 and the second aspheric surface 320 satisfy:

| | A | B | C | D | E | F |
|---|---|---|---|---|---|---|
| first aspheric surface | 2.62e−6 | 3.96e−8 | −1.97e−11 | 1.23e−12 | 0 | 0 |
| second aspheric surface | −9.33e−5 | −3.12e−7 | 4.13e−8 | 7.60e−10 | 0 | 0. |

The meanings, units of various columns and the meanings of the parameters of the columns in Table 2 are the same as those in Table 1 and will not be repeated herein.

Figure 5:
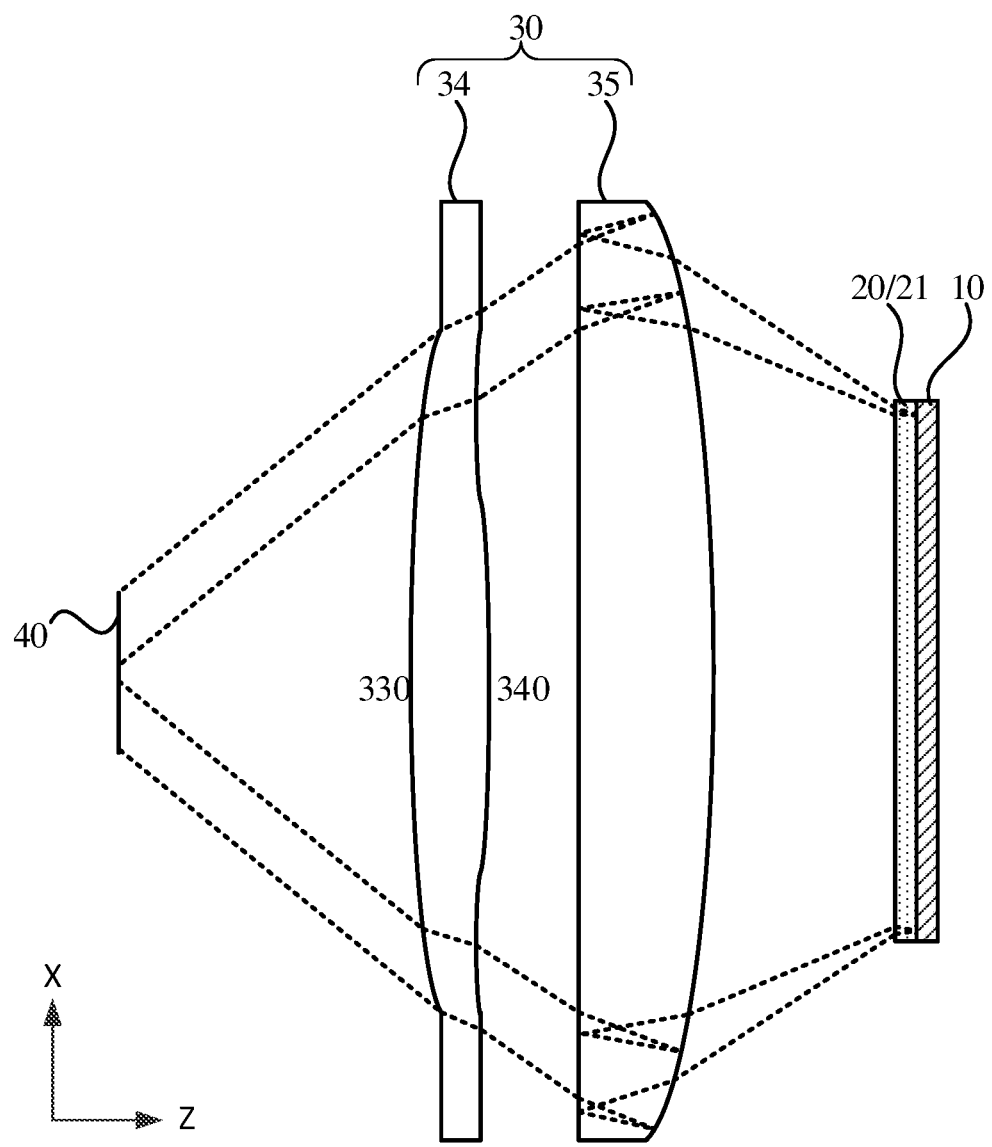
FIG. 5 is a schematic diagram of a head-mounted display optical module provided by another embodiment of the present disclosure.

FIG. 5 is a schematic diagram of a head-mounted display optical module provided by another embodiment of the present disclosure. Referring to FIG. 5, the optical lens group 30 includes a second convex lens 34 and a first lens group 35, and the first lens group 35 is located between the second convex lens 34 and the protective layer 20. The display panel 10, the protective layer 20, the first lens group 35, and the second convex lens 34 are disposed to have a same optical axis. The first lens group 35 can include one or more lenses.

In an embodiment, referring to FIG. 5, the second convex lens 34 includes a third aspherical surface 330 and a fourth aspherical surface 340, and the fourth aspherical surface 340 is located between the third aspherical surface 330 and the first lens group 35. The third aspherical surface 330 and the fourth aspherical surface 340 satisfy the even-order aspherical formula:

$$z_2 = \frac{cy^2}{1 + \sqrt{1 - (1+k)c^2y^2}} + Ay^4 + By^6 + Cy^8 + Dy^{10} + Ey^{12} + Fy^{14},$$

where $z_2$ denotes an axial sagittal height of an aspheric surface, y denotes a radial distance of the aspheric surface, k denotes a conic coefficient, c denotes a curvature, and A, B, C, D, E, F are aspheric coefficients.

And the third aspheric surface and the fourth aspheric surface satisfy:

| | A | B | C | D | E | F |
|---|---|---|---|---|---|---|
| third aspheric surface | 7.93e−7 | 4.32e−9 | 3.38e−10 | −1.66e−12 | 2.01e−15 | 0 |
| fourth aspheric surface | 7.55e−6 | −5.18e−8 | 6.57e−10 | −2.12e−12 | 2.53e−15 | 0. |

Figure 6:
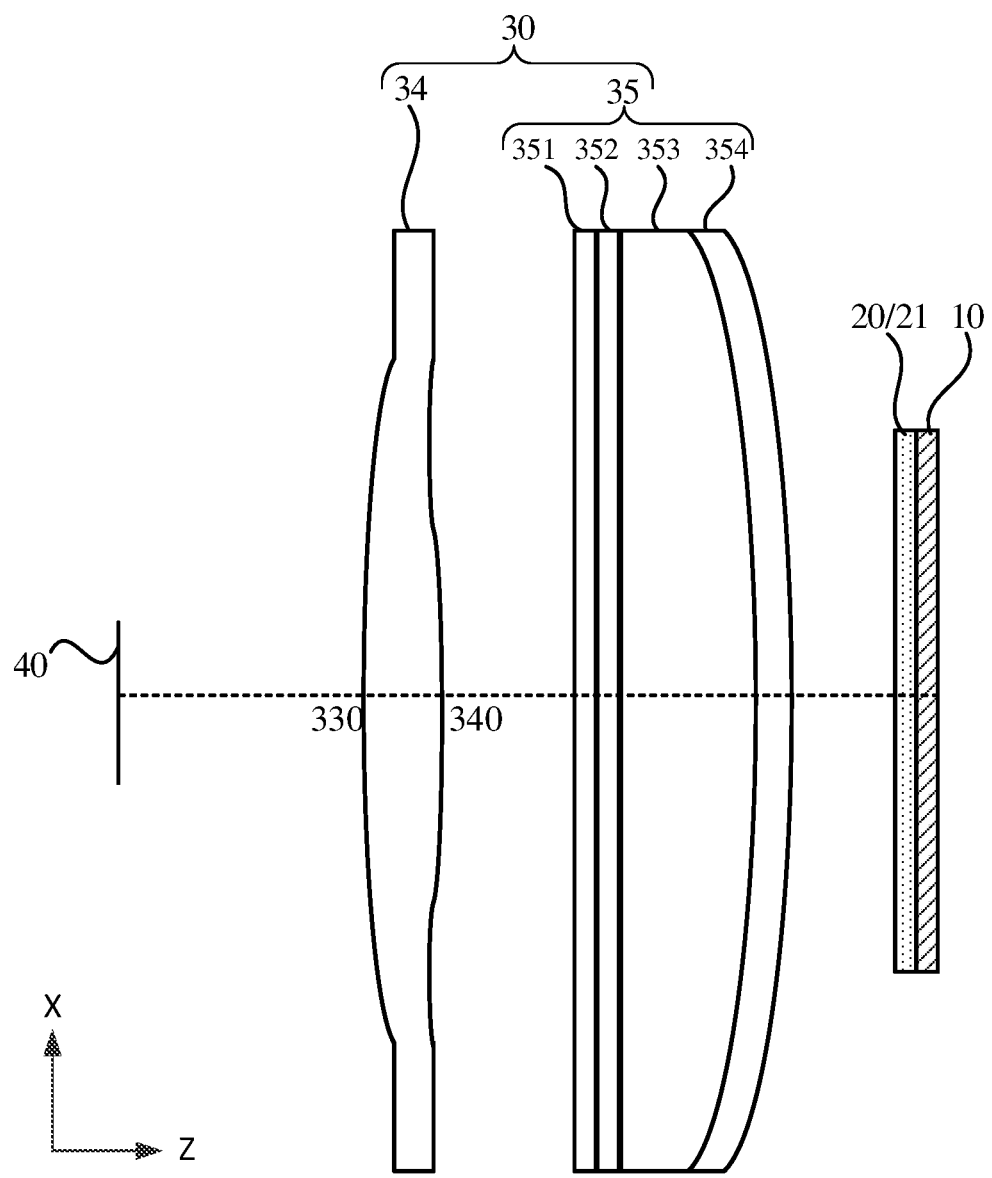
FIG. 6 is a schematic diagram of a head-mounted display optical module provided by another embodiment of the present disclosure.

FIG. 6 is a schematic diagram of a head-mounted display optical module provided by another embodiment of the present disclosure. Referring to FIG. 6, the first lens group 35 includes a polarizer 351, a phase retarder 352, a third convex lens 353 and a selective transflective film 354. The polarizer 351, the phase retarder 352, the third convex lens 353, and the selective transflective film 354 are sequentially provided along an optical axis from the user viewing side 40 towards the display panel 10.

Exemplarily, referring to FIG. 6, the polarizer 351 is a reflective polarizer, and the phase retarder 352 is a quarter wave plate.

TABLE 3

Table of design parameters of various optical surfaces of a third type

| Surface Number | Surface Shape | Radius of Curvature | Thickness | Material | Machinery Diameter | Conic Coefficient |
|---|---|---|---|---|---|---|
| OBJ | Spherical Surface | Infinity | Infinity | | 0 | 0 |
| STO | Spherical Surface | Infinity | 15 | | 8 | 0 |
| 2 | Even-Order Aspheric Surface | 115.78 | 4.20 | E48R | 49 | −41.41 |
| 3 | Even-Order Aspheric Surface | −106.61 | 4.76 | | 49 | 8.66 |
| 4 | Spherical Surface | Infinity | 0.11 | PMMA | 49 | 0 |
| 5 | Spherical Surface | Infinity | 7.29 | N-BK7 | 49 | 0 |
| 6 | Spherical Surface | −77.24 | 0.19 | PMMA | 49 | 0 |
| 7 | Spherical Surface | −77.24 | 0.19 | MIRROR | 49 | 0 |
| 8 | Spherical Surface | −77.24 | −7.29 | N-BK7 | 49 | 0 |
| 9 | Spherical Surface | Infinity | −0.11 | PMMA | 49 | 0 |
| 10 | Spherical Surface | Infinity | 0.11 | MIRROR | 49 | 0 |
| 11 | Spherical Surface | Infinity | 7.29 | N-BK7 | 49 | 0 |
| 12 | Spherical Surface | −77.24 | 0.19 | PMMA | 49 | 0 |
| 13 | Spherical Surface | −77.24 | 8.95 | | 49 | 0 |
| 14 | Gradient Refractive Index Surface | Infinity | 0.90 | | 28 | 0 |
| IMA | Spherical Surface | Infinity | | | 28 | 0 |

The corresponding design parameters of the optical surface in Table 3 correspond to the head-mounted display optical module shown in FIG. 6, and the third aspheric surface 330 and the fourth aspheric surface 340 satisfy:

| | A | B | C | D | E | F |
|---|---|---|---|---|---|---|
| third aspheric surface | 7.93e−7 | 4.32e−9 | 3.38e−10 | −1.66e−12 | 2.01e−15 | 0 |
| fourth aspheric surface | 7.55e−6 | −5.18e−8 | 6.57e−10 | −2.12e−12 | 2.53e−15 | 0. |

The meanings, units of various columns and the meanings of the parameters of the columns in Table 3 are the same as those in Table 1 and will not be repeated herein.

An embodiment of the present disclosure further provides a head-mounted display optical device, and it includes the head-mounted display optical module and the display panel in any of the above embodiments. The head-mounted display optical module is located at the light-emitting display side of the display panel. It can be understood that, for the sake of clarity, the schematic view of the head-mounted display optical module shown in FIG. 1 to FIG. 6 also illustrates the display panel 10 and the user viewing side 40. Since the head-mounted display optical device includes the head-mounted display optical module in any one of the above embodiments, it has the beneficial effects of the above-mentioned head-mounted display optical module, that is, the user can observe the image without color shift at the large field of view, and the optical efficiency can also be improved.

Note that the above are only exemplary embodiments of the present disclosure and the applied technical principles. Those skilled in the art will understand that the present disclosure is not limited to the specific embodiments described herein, and various obvious modifications, readjustments, combinations and substitutions can be made by those skilled in the art without departing from the scope of the present disclosure. Therefore, although the present disclosure has been described in more detail through the above embodiments, the present disclosure is not limited to the above embodiments, and other equivalent embodiments can be included without departing from the concept of the present disclosure, while the scope of the present disclosure is determined by the scope of the appended claims.

What is claimed is:

1. A head-mounted display optical module for imaging a display image of a display panel at a user viewing side, the head-mounted display optical module comprising:
    an optical lens group located at a light-emitting display side of the display panel; and at least one protective layer located on an optical path between the display panel and the optical lens group, wherein the at least one protective layer comprises at least one first protective layer having a refractive index continuously changing therein at least along a radial direction, and the radial direction is located in a plane of the at least one first protective layer and points from a center of the at least one first protective layer to an edge of the at least one first protective layer, wherein the refractive index of the first protective layer satisfies: $n = m_0 + m_2 \cdot r^2 + m_4 \cdot r^4 + j \cdot z_1$, n denotes the refractive index of the first protective layer, r denotes a radial distance from the center of the first protective layer, $z_1$ denotes an axial distance from the center of the first protective layer, the axial direction is perpendicular to the plane of the first protective layer, and $m_0$, $m_2$, $m_4$, and j are real numbers.

2. The head-mounted display optical module according to claim 1, wherein $n = 1.5 + 0.046 \, r^2$.

3. The head-mounted display optical module according to claim 1, wherein $n = 1.5 + 0.01r^2 + 0.004r^4$.

4. The head-mounted display optical module according to claim 1, wherein the refractive index of the first protective layer further continuously changes therein along the axial direction and $n = 1.5 + 0.005r^2 + 0.0001r^4 + 0.003z_1$.

5. The head-mounted display optical module according to claim 1, wherein the at least one protective layer comprises at least one second protective layer, any two positions inside the at least one second protective layer have a same refractive index, and the at least one second protective layer is located between the display panel and the at least one first protective layer.

6. The head-mounted display optical module according to claim 1, wherein the optical lens group comprises a first convex lens, a curved mirror and a transflective component;

the curved mirror is located at a side of the transflective component facing away from the user viewing side;

the transflective component is located on an optical path between the first convex lens and the curved mirror; and the first convex lens is located between the at least one protective layer and the transflective component.

7. The head-mounted display optical module according to claim 6, wherein the curved mirror comprises a first aspheric surface, the first convex lens comprises a second aspheric surface, the first aspheric surface and the second aspheric surface satisfy an even-order aspheric surface formula:

$$z_2 = \frac{cy^2}{1 + \sqrt{1 - (1+k)c^2 y^2}} + Ay^4 + By^6 + Cy^8 + Dy^{10} + Ey^{12} + Fy^{14},$$

$z_2$ denotes an axial sagittal height of an aspheric surface,
y denotes a radial distance of the aspheric surface,
k denotes a conic coefficient,
c denotes a curvature, and A, B, C, D, E, F denote aspheric coefficients; and the first aspherical surface and the second aspherical surface satisfy:

| | A | B | C | D | E | F |
|---|---|---|---|---|---|---|
| first aspheric surface | 2.62e−6 | 3.96e−8 | −1.97e−11 | 1.23e−12 | 0 | 0 |
| second aspheric surface | −9.33e−5 | −3.12e−7 | 4.13e−8 | 7.60e−10 | 0 | 0 |

8. The head-mounted display optical module according to claim 6, wherein the curved mirror comprises a first aspheric surface, the first convex lens comprises a second aspheric surface, the first aspheric surface and the second aspheric surface satisfy an even-order aspheric surface formula:

$$z_2 = \frac{cy^2}{1 + \sqrt{1 - (1+k)c^2 y^2}} + Ay^4 + By^6 + Cy^8 + Dy^{10} + Ey^{12} + Fy^{14},$$

$z_2$ denotes an axial sagittal height of an aspheric surface,
y denotes a radial distance of the aspheric surface,
k denotes a conic coefficient,
c denotes a curvature,
A, B, C, D, E, F denote aspheric coefficients, and
the first aspherical surface and the second aspherical surface satisfy:

| | A | B | C | D | E | F |
|---|---|---|---|---|---|---|
| first aspheric surface | 2.71e−6 | 4.01e−8 | −1.86e−11 | 2.13e−12 | 0 | 0 |
| second aspheric surface | −9.42e−5 | −3.23e−7 | 4.02e−8 | 6.55e−10 | 0 | 0 |

9. The head-mounted display optical module according to claim 1, wherein the optical lens group comprises a second convex lens and a first lens group located between the second convex lens and the protective layer, the second convex lens comprises a third aspherical surface and a fourth aspherical surface, the fourth aspheric surface is located between the third aspheric surface and the first lens group, the third aspherical surface and the fourth aspherical surface satisfy an even-order aspherical formula:

$$z_2 = \frac{cy^2}{1 + \sqrt{1 - (1+k)c^2 y^2}} + Ay^4 + By^6 + Cy^8 + Dy^{10} + Ey^{12} + Fy^{14},$$

$z_2$ denotes an axial sagittal height of an aspheric surface,
y denotes a radial distance of the aspheric surface,
k denotes a conic coefficient,
c denotes a curvature, A, B, C, D, E, F denote aspheric coefficient, and the third aspherical surface and the fourth aspherical surface satisfy:

|  | A | B | C | D | E | F |
|---|---|---|---|---|---|---|
| third aspheric surface | 7.93e−7 | 4.32e−9 | 3.38e−10 | −1.66e−12 | 2.01e−15 | 0 |
| fourth aspheric surface. | 7.55e−5 | −5.18e−8 | 6.57e−10 | −2.12e−12 | 2.53e−15 | 0 |

\* \* \* \* \*